US006905128B1

(12) United States Patent
Lear et al.

(10) Patent No.: US 6,905,128 B1
(45) Date of Patent: Jun. 14, 2005

(54) MANEUVERABLE AND BRAKEABLE HIGH PERFORMANCE SNOW SLED

(75) Inventors: Jennifer Lear, Bozeman, MT (US); Wade M. Wolf, Bozeman, MT (US)

(73) Assignee: Cougar Enterprises, Inc, Bozeman, MT (US)

( * ) Notice: Subject to any disclaimer, the term of this patent is extended or adjusted under 35 U.S.C. 154(b) by 155 days.

(21) Appl. No.: 10/386,179

(22) Filed: Mar. 11, 2003

Related U.S. Application Data

(60) Provisional application No. 60/364,323, filed on Mar. 14, 2002.

(51) Int. Cl.$^7$ .............................................. B62B 13/06
(52) U.S. Cl. ....................... 280/16; 280/17; 280/28.11; 280/28.14; 280/28.16
(58) Field of Search ............................... 280/845, 14.1, 280/15, 16, 17, 18, 19, 21.1, 22, 22.1, 28.11, 280/28.14, 28.16, 25, 182, 183, 180

(56) References Cited

U.S. PATENT DOCUMENTS

| | | | | |
|---|---|---|---|---|
| 2,247,182 A | * | 6/1941 | Bosca | 280/21.1 |
| 2,443,348 A | | 6/1948 | Flajole | |
| 2,545,268 A | | 3/1951 | Flajole | |
| 3,145,030 A | * | 8/1964 | Millis | 280/16 |
| 3,325,179 A | * | 6/1967 | Bissett | 280/25 |
| 3,326,569 A | * | 6/1967 | Leeming | 280/16 |
| 3,398,970 A | * | 8/1968 | Kotaro | 280/16 |
| 3,540,750 A | * | 11/1970 | Berger | 280/16 |
| 3,542,389 A | | 11/1970 | Stiller | |
| 3,632,125 A | * | 1/1972 | Krippelz | 280/14.1 |
| 3,666,281 A | * | 5/1972 | Billings | 280/28.15 |
| 3,746,357 A | * | 7/1973 | Haskins | 280/15 |
| 3,799,564 A | * | 3/1974 | Eisenschmid | 280/14.1 |
| 3,833,234 A | * | 9/1974 | Schreiber | 280/16 |
| 3,841,649 A | * | 10/1974 | McMullen | 280/16 |
| 3,917,301 A | * | 11/1975 | Fabris | 280/28.14 |
| 3,948,536 A | | 4/1976 | Konrad | |
| 4,082,304 A | * | 4/1978 | Kendrena | 280/28.15 |
| 4,114,912 A | | 9/1978 | Sweeney | |
| 4,165,087 A | * | 8/1979 | Kagawa | 280/16 |
| 4,175,760 A | * | 11/1979 | Gustafson | 280/16 |
| 4,193,609 A | | 3/1980 | Bissett | |
| 4,632,408 A | * | 12/1986 | Olpp et al. | 280/28.14 |
| 4,775,161 A | * | 10/1988 | Bridges | 280/16 |
| 4,796,902 A | * | 1/1989 | Capra | 280/16 |
| 5,344,167 A | * | 9/1994 | Strouth | 280/14.1 |
| 6,019,380 A | * | 2/2000 | Goodman et al. | 280/28.14 |
| 6,036,202 A | * | 3/2000 | LaCome | 280/28.14 |
| 6,179,305 B1 | * | 1/2001 | Capozzi et al. | 280/28.14 |
| 6,241,265 B1 | * | 6/2001 | Kovar et al. | 280/16 |
| 6,279,925 B1 | * | 8/2001 | Miller | 280/22.1 |
| 6,530,582 B2 | * | 3/2003 | Dempster | 280/22.1 |

* cited by examiner

*Primary Examiner*—Christopher P. Ellis
*Assistant Examiner*—Jeff Restifo
(74) *Attorney, Agent, or Firm*—Ronald H. Kullick

(57) ABSTRACT

A maneuverable, brakeable, roll resistant high performance snow sled suitable for use on downwardly sloping terrain. The preferred embodiment of the sled embodies a tandem, mirror image, in-line suspension and shock absorbing system connecting the main frame member upon which a seat is mounted to a snow board type runner. Roll stability is achieved utilizing stabilizer wings attached to each side of the main frame member embodying a torsion resistance mechanism. Speed control, stopping and turning of the sled is accomplished utilizing an independently operable braking system.

24 Claims, 12 Drawing Sheets

MANEUVERABLE AND BRAKEABLE HIGH PERFORMANCE SNOW SLED

CROSS REFERENCE TO RELATED APPLICATION

This application is a continuation-in-part of and claims priority based upon co-pending Provisional Specification, Application Ser. No. 60/364,323, filed Mar. 14, 2002. The disclosure of this application is hereby incorporated by reference in its entirety, including all figures, tables and drawings.

BACKGROUND OF THE INVENTION

1. Field

The present invention relates to the snow sled art, specifically to an improved high performance, maneuverable and speed controllable sled for transporting one or more individuals over downwardly sloping, snow covered terrain.

2. State of the Art

There are presently known a variety of types of sleds having utility for moving people and/or cargo over the snow on a flat plane, or downhill. These sleds generally incorporate a platform riding upon a single or multiple, laterally spaced skis or runners which contact the snow, or a platform which directly contacts the snow. Some types of sleds also incorporate a seat, steering and/or braking means. See for example, U.S. Pat. Nos. 4,193,609, 4,114,912, 3,542,389, 2,545,268 and 2,443,348. However, none of the literature describes a snow sled having enhanced maneuverability, supplemental braking/steering means, an in-line suspension, shock absorbing system and further comprising resistance torsion stabilizer wings extending laterally on each side of sled, each containing at least one stabilizing runner at the terminus of the stabilizer wing which maintains contact with the snow surface, providing roll and turning stability.

An advantage of the invention is a high performance snow sled having an in-line, multi-stage suspension and shock absorbing system which provide improved control, stability and ride characteristics in which the primary method of steering is by the operator leaning on the roll axis in the desired turn direction.

Another advantage is a high performance snow sled having improved steering, speed control, stability and performance characteristics achieved by independently operating braking systems which braking system may be used to assist with the primary turning system.

Yet another advantage of the invention is a high performance snow sled having enhanced roll axis stability during a turn achieved with independently functioning stabilizer wings incorporating torsion resistance means on each side of the sled and having affixed to each stabilizer wing, a stabilizer runner at a position lateral, distal and parallel to the longitudinal frame member of the sled.

All patents, patent applications, provisional patent applications and publications referred to or cited herein, are incorporated by reference in their entirety to the extent they are not inconsistent with the explicit teachings of the specification.

SUMMARY OF THE INVENTION

The present invention relates to a maneuverable, brakeable, high performance snow sled having enhanced maneuverability, stability and speed control and stopping capabilities which comprises a seat portion adjustably mounted on an elongated main longitudinal frame member, which longitudinal frame member is suspended by an in-line, two stage suspension and shock absorbing system hingedly attached at the lower portion thereof to a base plate. To the base plate is attached an elongated main runner positioned directly beneath and such that the elongated portion thereof is aligned parallel with the main longitudinal frame member. Steering of the sled is accomplished by the operator leaning in the direction of the desired turn. The leaning motion results a shifting of the weight of the sled to the edge of the main runner on the side of the desired turn, thereby causing the sled to turn in the direction the operator is leaning. The operator can control the degree of the turn by the amount of lean, the more the lean, the sharper the turn. The in-line, two stage suspension and shock absorbing means functions to allow the main runner to flex to accommodate the terrain providing maximum surface contact and turning traction as well as providing a comfortable ride for the operator. The invention further comprises stabilizer wings rotatably attached to the elongated portion of said main longitudinal frame member on each side thereof at, one or, more points via a stabilizer wing attachment bracket. At the distal end of each stabilizer wing is rigidly affixed a stabilizing runner, generally shorter than and aligned parallel to the main runner. Each stabilizer wing moves independent of the other and the rotation travel distance is limited upwardly around the longitudinal axis by a torsion resistance means such that stabilizing runner affixed to the stabilizer wing maintains contact with the snow surface while the sled is traveling in a straight line or turning, thereby providing stability to the sled against roll over. The sled also embodies a braking system, which when activated by the operator, causes a one or both of the independently functioning brake pads to be deployed to drag upon the snow to assist in steering, speed control and stopping of the sled as desired.

BRIEF DESCRIPTION HAVE THE DRAWINGS

DETAILED DESCRIPTION OF THE PREFERRED EMBODIMENTS

Figure 1:
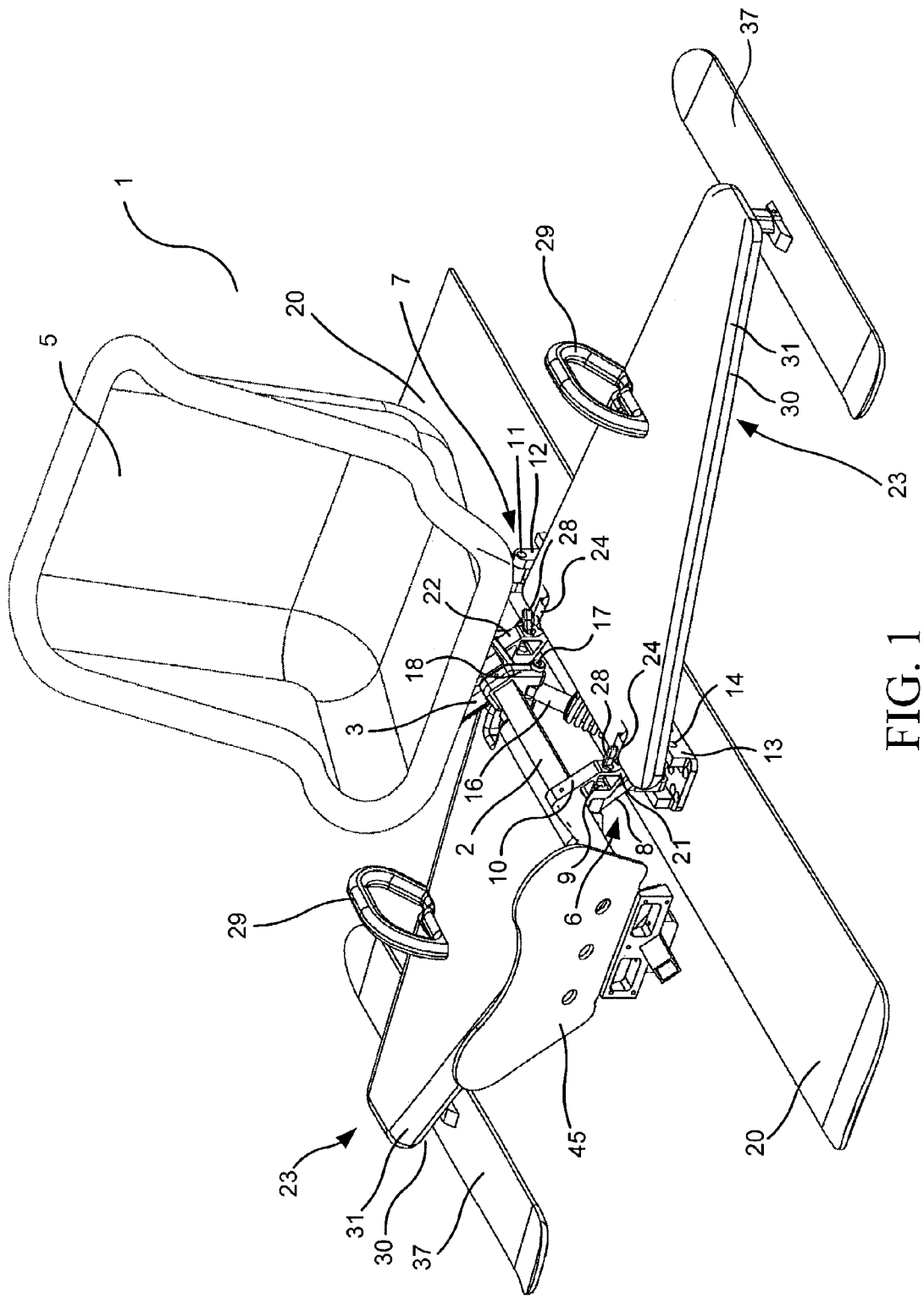
FIG. 1 is a front perspective view of a preferred embodiment of the high performance snow sled of the present invention without operator protection cowlings.

Referring to FIGS. 1 to 12, the high performance snow sled of the present invention represented by numeral 1 comprises an elongated main longitudinal frame member 2, which may be virtually of any configuration, including but not limited to, circular, rectangular, triangular, square or diamond shaped when viewed from a front or rear cross section. It may be solid, or tubular in construction. Said main longitudinal frame member 2 may comprise more than one frame member attached to each other in parallel relationship. However, for weight and cost reasons, the preferred embodiment is a single main longitudinal frame member 2 of sufficient cross section dimension and of a suitable material, to be rigid and such that it will not significantly flex or bend when stressed. Main longitudinal frame member 2 may be made of a number of suitable materials including, but not limited to aluminum, steel, alloys, high strength plastics and composite materials. The preferred material is aluminum or an aluminum alloy for strength and lightweight characteristics. The length of main longitudinal frame member 2 is determined by the desired length of sled 1. Sled 1 may be of a size to accommodate one or more persons of adult size or may be of a size suitable for one or more children. It has been determined that for an average size adult operator, sled 1 is comfortable and performs as intended when the length of main longitudinal frame member 2, front to rear is about 45 inches. However, it may be longer or shorter as desired and depending upon the size of the operator. Adjustably mounted upwardly on the elongated portion of said longitudinal frame member 2 by seat front attachment means 3 and seat rear attachment means 4 and preferably somewhat toward the rear of the of elongated portion of said main longitudinal frame member 2 is a seat 5, preferably having a horizontal seat portion, a vertical back portion and vertical side portions such that the operator is provided with back support and is protected from falling off of the sled during use. Optionally, seat may incorporate a seat and/or shoulder harnesses to further restrain the operator. Preferably, seat 5 is positioned on main longitudinal frame member 2 such that the center of gravity of sled 1 with the operator on board is approximately at the lateral and longitudinal midpoint of main runner 20. This is generally rearward of the midportion of the elongated portion of said main longitudinal frame member 2. The center of gravity at this position provides for optimal maneuvering and stability characteristics. If desired, sled 1 may be configured and sized to include an additional seat or seats preferably rearward of seat 5 to accommodate a passenger(s). Seat 5 and any additional seats may be of any suitable material including, but not limited to wood, metal, plastic or a composite material. Preferably, seat 5 is made of a lightweight, molded rigid plastic material.

Figure 2:
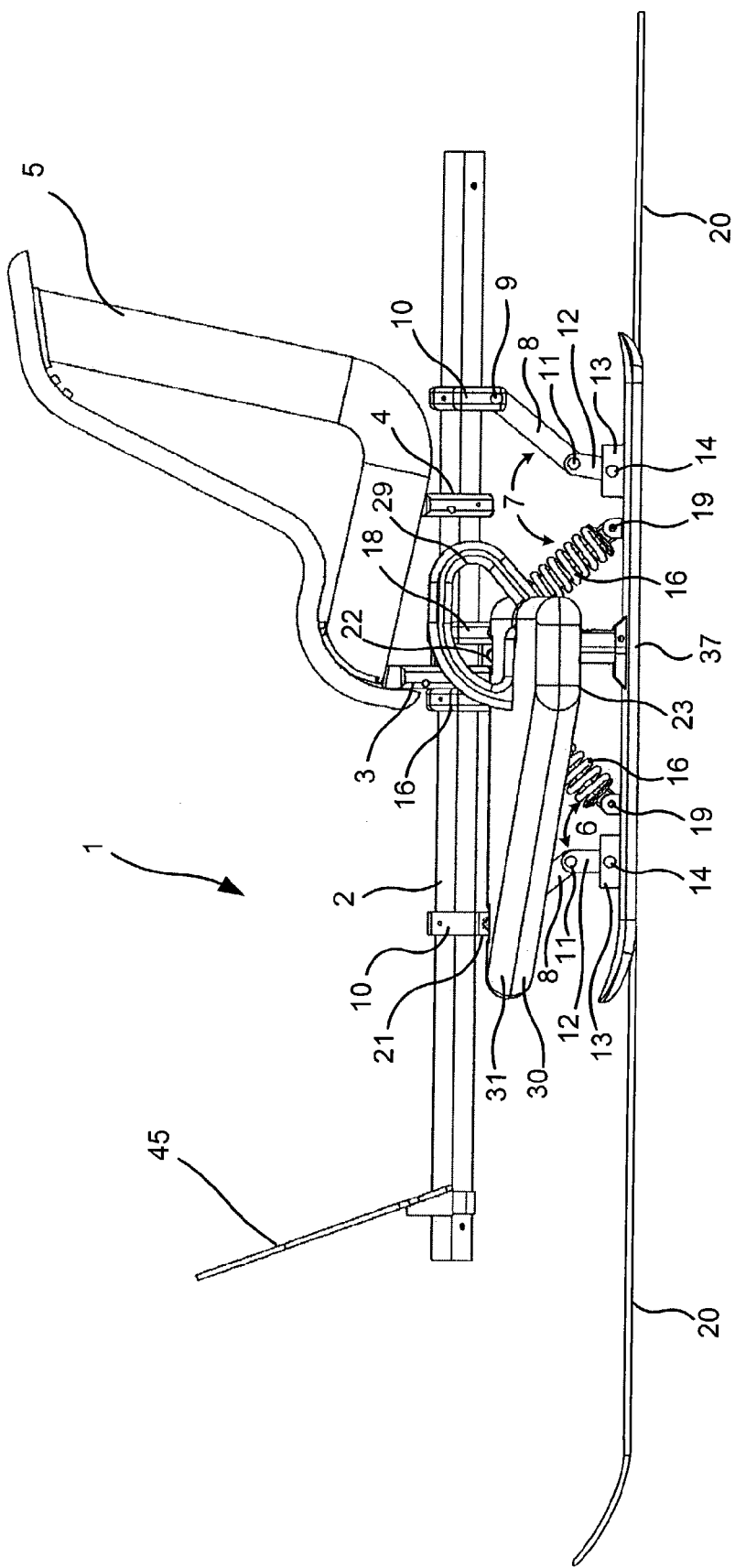
FIG. 2 is a side view of the preferred embodiment as illustrated in FIG. 1.
Figure 3:
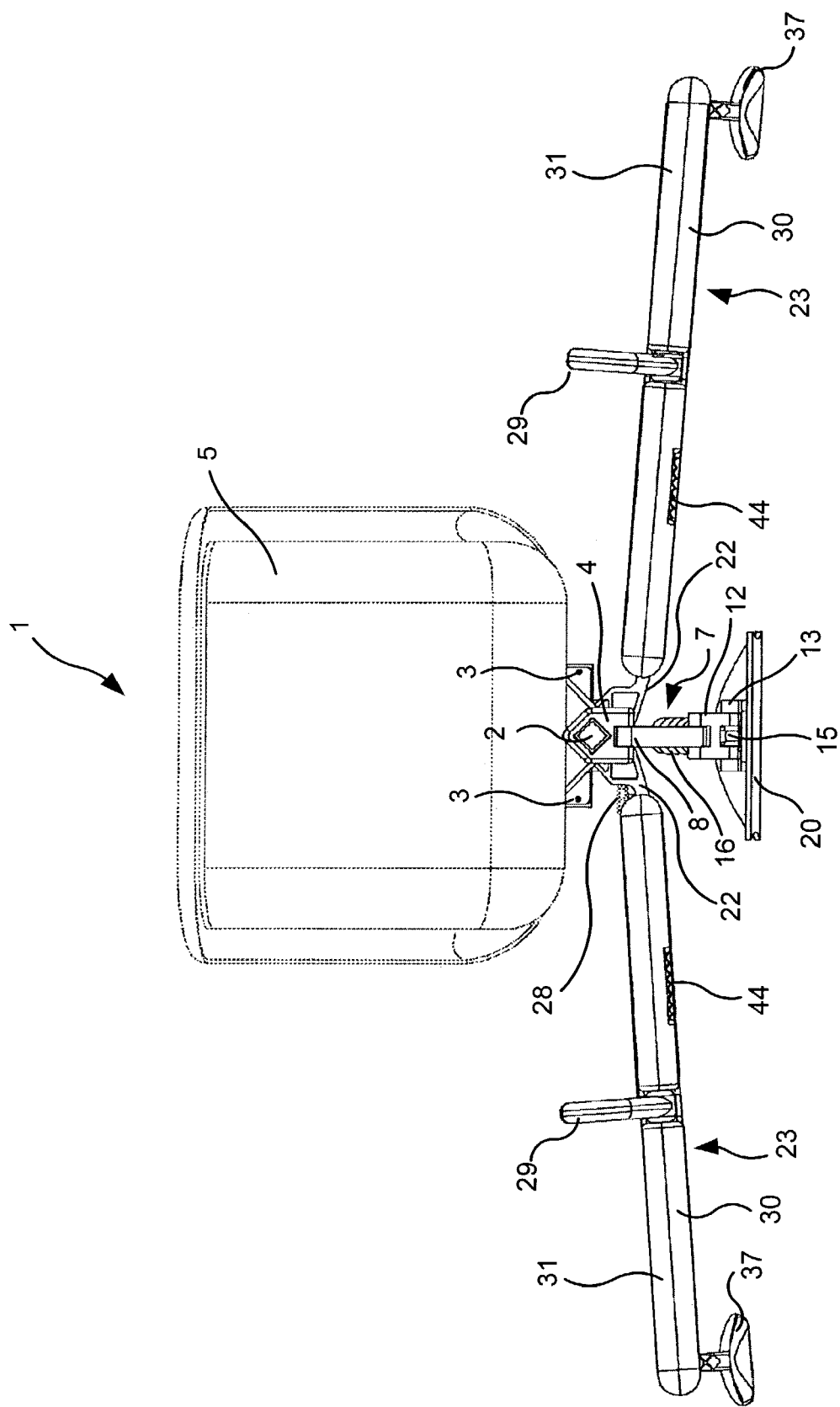
FIG. 3 is a rear view of the preferred embodiment as illustrated in FIG. 1.
Figure 4:
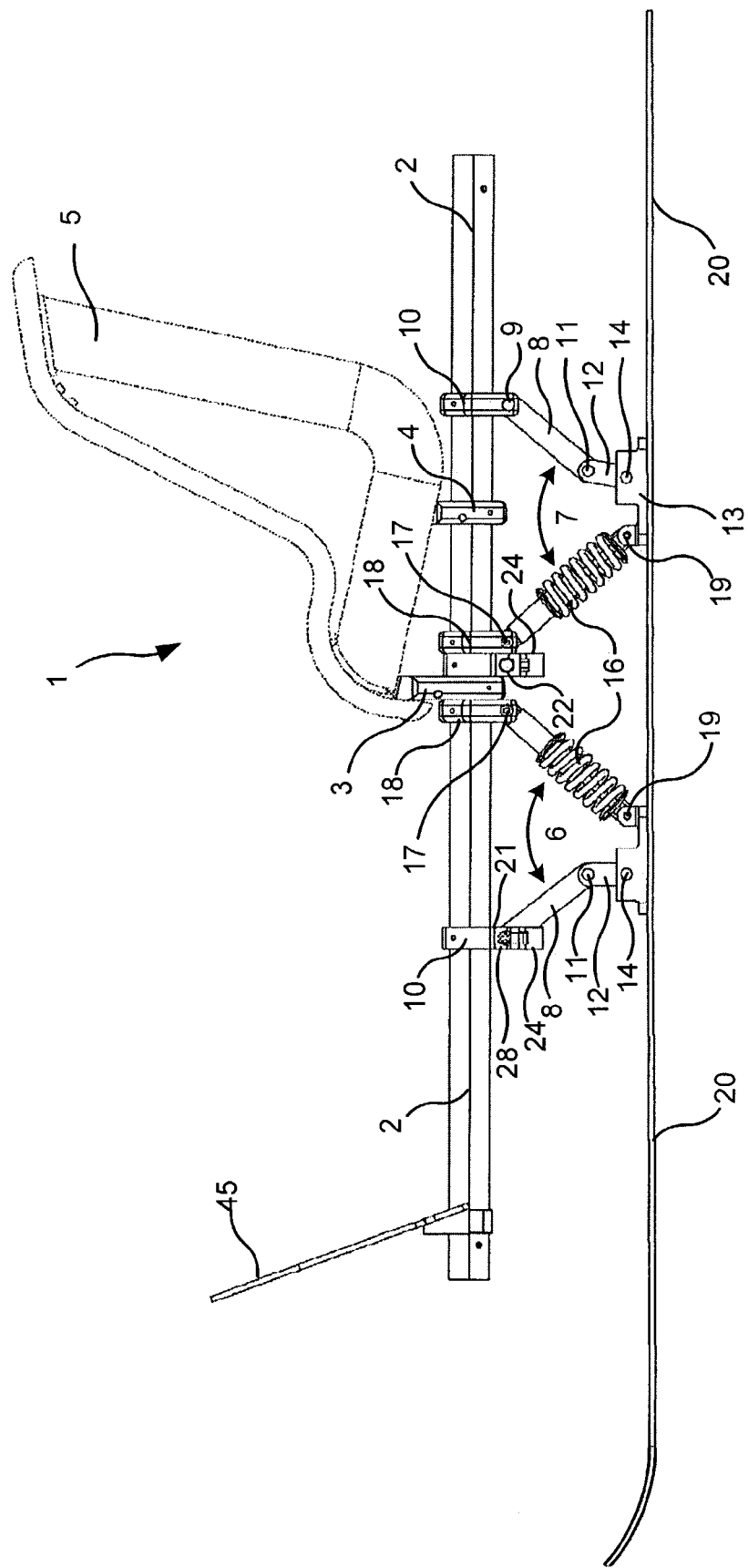
FIG. 4 is a side view of the preferred embodiment as illustrated in FIG. 2 with stabilizer wings removed to illustrate a preferred embodiment, tandem, in-line, two stage suspension and shock absorbing means.

Referring to FIG. 2, and FIG. 4, preferably adjustably attached in mirror image, tandem relationship to each other to the elongated portion of said main longitudinal frame member 2 are preferably a front in-line, two stage suspension and shock absorbing means 6 and rear in-line two stage suspension and shock absorbing means 7. While a single in-line, two stage suspension and shock absorbing means may be utilized, particularly in a smaller sled to accommodate smaller individuals or children, superior maneuverability, stability and performance characteristics are achieved with the preferred mirror image, tandem configuration. Each suspension and shock absorbing means 6 and 7 comprise a damper bar 8 connected by an upper damper hinge means 9 at the top portion thereof with a top damper attachment means 10, and connected at the lower portion thereof by lower damper hinge means 11 to base plate connecting bar 12, such that the lower portion of said damper bar 8 is positioned angularly downward and inward toward base plate 13. Said base plate connecting bar 12 is attached to base plate 13 by base plate hinge means 14. Said base plate 13 also contains damper stop bar 15 illustrated in FIG. 5, the function of which is to restrict the travel of base plate connecting bar 12 to restrict the front and the rear of main longitudinal frame member 2 from contacting main runner 20 as sled 1 travels over bumps and uneven terrain. The angle of said damper bar 8 from the point of attachment thereof by upper damper hinge means 9 to lower damper hinge means 11 when sled 1 is standing on level terrain without the operator is from about thirty degrees to about sixty degrees and preferably about forty-five degrees. Said in-line, tandem, two stage suspension and shock absorbing means 6 and 7 further comprise shock absorber 16 attached at the top portion thereof by upper shock absorber hinge means 17 to top shock absorber attachment means 18. Said top shock absorber attachment means 18 is adjustably attached to main longitudinal frame member 2. Said shock absorber 16 is attached at the bottom portion thereof by lower shock absorber hinge means 19 to base plate 13 such that said lower portion of said shock absorber 16 is positioned angularly downward and inward toward the base plate 13. The angle of said shock absorber 16 from the point of attachment thereof by upper shock absorber hinge means 17 to top shock absorber mounting means 18 to the point of attachment thereof to base plate 13 by lower shock absorber hinge means 19 is from about forty degrees to about fifty degrees, and preferably about forty-five degrees when sled 1 is standing on level terrain without the operator. Said shock absorber 16 may be any generally available shock absorber, including air rebound and coil over gas shock absorbers. Preferably, shock absorber 16 is a coil over gas shock absorber. For desirable maneuvering and stability characteristics, it is desirable that sled 1 have a relatively low center of gravity. Thus, it is desirable that front suspension and shock absorbing means 6 and rear suspension and shock absorbing means 7 are such that the vertical distance from the lower portion of the elongated portion of main longitudinal frame member 2 to the top of main runner 20 is from about five inches to about twelve inches, and preferably about seven inches for an adult sized sled. The distance between top shock absorber attachment means 18 when front suspension and shock absorbing suspension means 6 and rear suspension and shock absorbing means 7 are positioned longitudinally in mirror image tandem on said main longitudinal frame member 2 is from about zero inches to about ten inches, preferably about two inches. The foregoing respective distances would be reduced for a smaller sled to accommodate a smaller person or a child, or increased if it is desired to provide for one or more passengers in addition to the operator, according to scale in respect to the length of main longitudinal frame member 2.

To base plate 13 is attached main runner 20. Main runner 20 is preferably removably attached to facilitate repair or replacement. It may, however, be fixably attached. Said main runner 20 may be attached to base plate 13 by any suitable attachment means including, but not limited to screws, bolts, clips and/or adhesives. Said main runner 20 is preferably planar, having a ski tipped front portion and rear portions. Preferably, the length of main runner 20 is such that it extends approximately equidistant beyond the front and the rear of the center of gravity of sled 1 when occupied by the operator. Generally, said main runner 20 extends from about twenty-eight inches to about forty inches, and preferably about thirty-five inches beyond the front and beyond the rear of the point of center of gravity of sled 1. Said main runner 20 should be of sufficient width such that when sled 1 is sitting on a flat surface, it will not tilt laterally in either direction. For an adult sized sled, said width is from about four inches to about to about fifteen inches, and preferably about ten inches. The width for a smaller sled to accommodate a smaller person or a child would be reduced according to the scale in respect to the length of the longitudinal frame member 2. Alternatively, said main runner 20, may comprise two or more snow ski type runners mounted in spaced parallel alignment to each other and parallel to said longitudinal frame member. Said main runner 20 may be of any material and structure commonly used to manufacture snow boards or skis, including, but not limited to wood, metal, plastic, fiberglass composite materials and combinations thereof. The underside of main runner 20 may be smooth, or may have one or more grooves running partially, or the full length thereof. Said main runner 20 may also contain metal edges running the length thereof for enhanced turning stability. Preferably, said main runner 20 is any commercially available snowboard.

Figure 5:
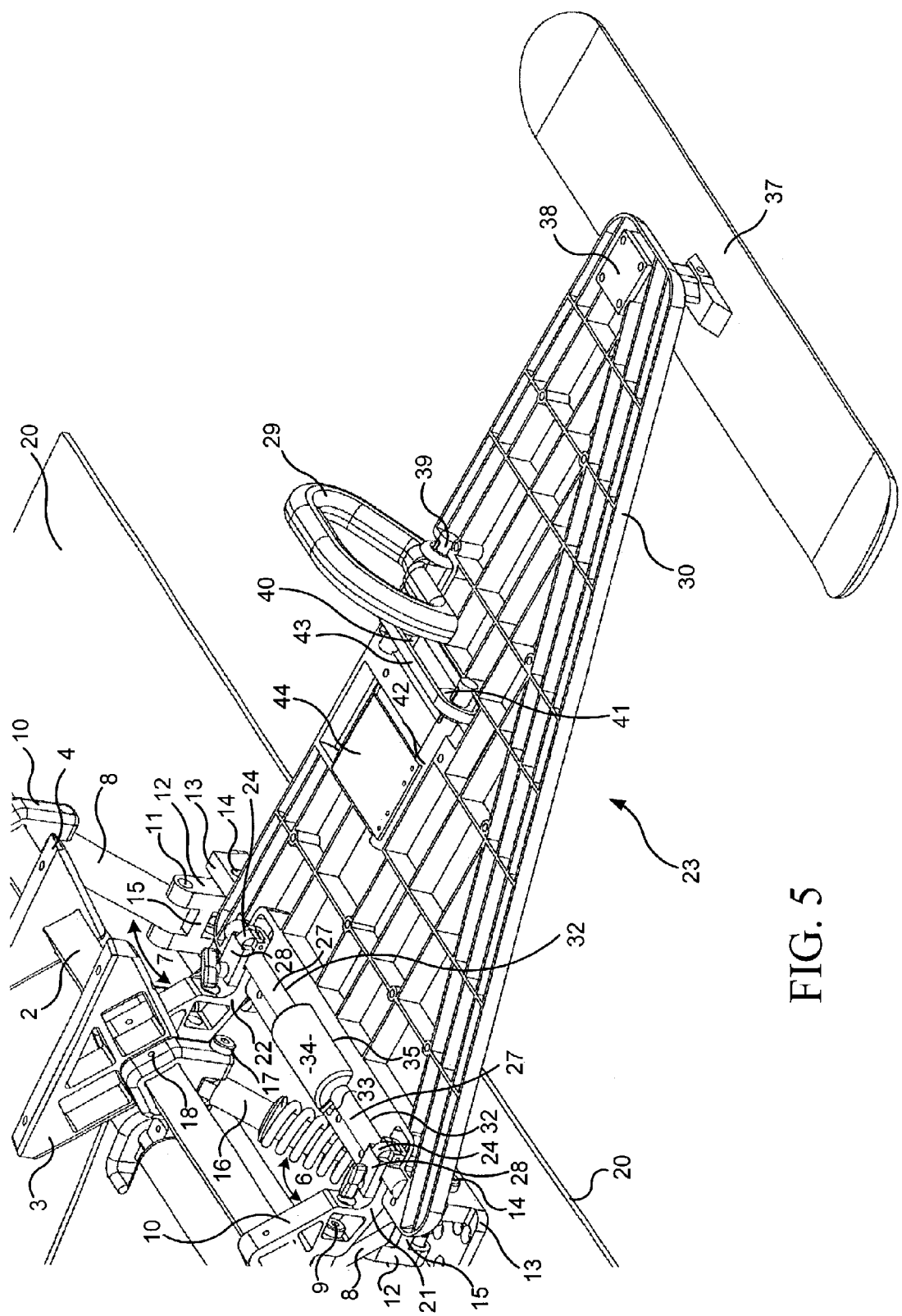
FIG. 5 is a view of the lower section of a stabilizer wing of the preferred embodiment of the present invention illustrating attachment to the main longitudinal frame member.
Figure 6:
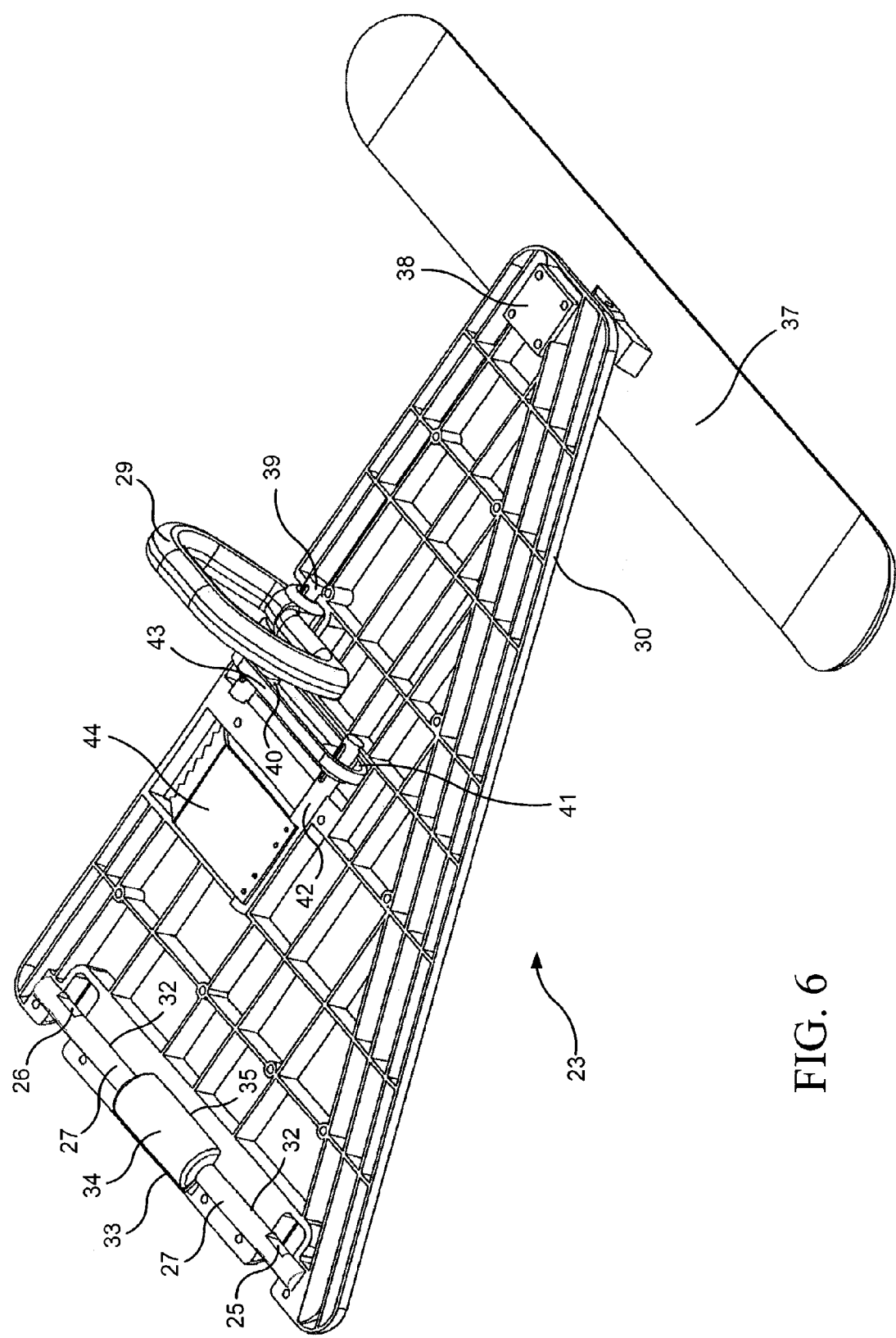
FIG. 6 is the view as illustrated in FIG. 5 illustrating resistance torsion means and braking means and communicating apertures for attachment to the main longitudinal frame member.

As illustrated by FIG. 1, adjustably attached to main longitudinal frame member 2, is at least one and preferably two stabilizer wing attachment brackets, 21 and 22. With reference to FIG. 1, said stabilizer wing attachment brackets 21 and 22 are adjustably attached at their medial point to the elongated portion of main longitudinal frame member 2. Said stabilizer wing attachment brackets 21 and 22 are preferably adjustably attached to enable stabilizer wings 23 to be moved forward or rearward on main longitudinal frame member 2 as is desirable to accommodate the operator and establish the desired center of gravity. With reference to FIG. 5 and FIG. 6, said stabilizer wing attachment brackets 21 and 22 further comprises a stabilizer wing coupling means portion 24 laterally disposed on each side thereof which attachably communicates with the communicating apertures 25 and 26 in torsion bar 27. Preferably, the stabilizer wing coupling means portion 24 of said stabilizer wing attachment brackets 21 and 22 is of a releasable design to enable said stabilizer wings 23 to be removed to facilitate transport of sled 1 or in the event repair is needed. Said stabilizer wings 23 are releasably coupled to the coupling means portion 24 of stabilizer wing attachment brackets 21 and 22 by coupling locking cap 28. With reference to FIG. 1, stabilizer wings 23 are preferably positioned directly laterally opposite the other on each side of main longitudinal frame member 2 and such that the rear portion thereof is laterally aligned approximately with the front portion of seat 5 such that the operator can conveniently reach hand brake levers 29 positioned when undeployed, in an upward, vertical position on stabilizer wings.

With reference to FIG. 1 and FIG. 5, stabilizer wings 23 preferably comprise lower stabilizer wing portion 30 that communicates with and is fastened to an essentially mirror image upper stabilizer wing portion 31. Lower stabilizer wing portion 30 is fastened to the upper stabilizer wing portion 31 by suitable means such as screws, bolts, straps or the like. The ability to separate lower stabilizer wing portion 30 from upper stabilizer wing portion 31 facilitates construction and maintenance or repair. FIG. 1 illustrates a complete stabilizer wing 23 showing lower stabilizer wing portion 30 fastened to upper stabilizer wing portion 31. Said stabilizer wings 23 may be constructed of any suitable material, including, but not limited to wood, steel, aluminum, fiberglass, molded plastic, fiberglass and composite materials and combinations thereof. Preferably, said stabilizer wings 23 are fully encased as demonstrated by FIG. 1 and constructed of a light weight, rigid, durable molded plastic. Alternatively, said stabilizer wings 23 may be constructed in a "skeletal" configuration, utilizing suitable solid rods, tubes and the like. Desirable stabilizing characteristics are achieved when the length of said stabilizer wings 23 from the point of attachment to stabilizer wing attachment brackets 21 and 22 to the distal end of said stabilizer wings 23 is from about 48 inches to about 60 inches and preferably from about 50 inches to about 56 inches for an adult operator sized sled. The width of said stabilizer wings 23 from the front to back thereof at the point of attachment with stabilizer wing attachment brackets 21 and 22 is from about 10 inches to about 30 inches and preferably about 18 inches. Said stabilizer wings 23 may be of any shape or configuration within said dimensions, including, but not limited to rectangular or "swept-wing" shaped as illustrated in FIG. 1. Preferably, said stabilizer wings 23 are of a "swept-wing" configuration to facilitate mounting and dismounting of sled 1 by the operator.

Figure 8:
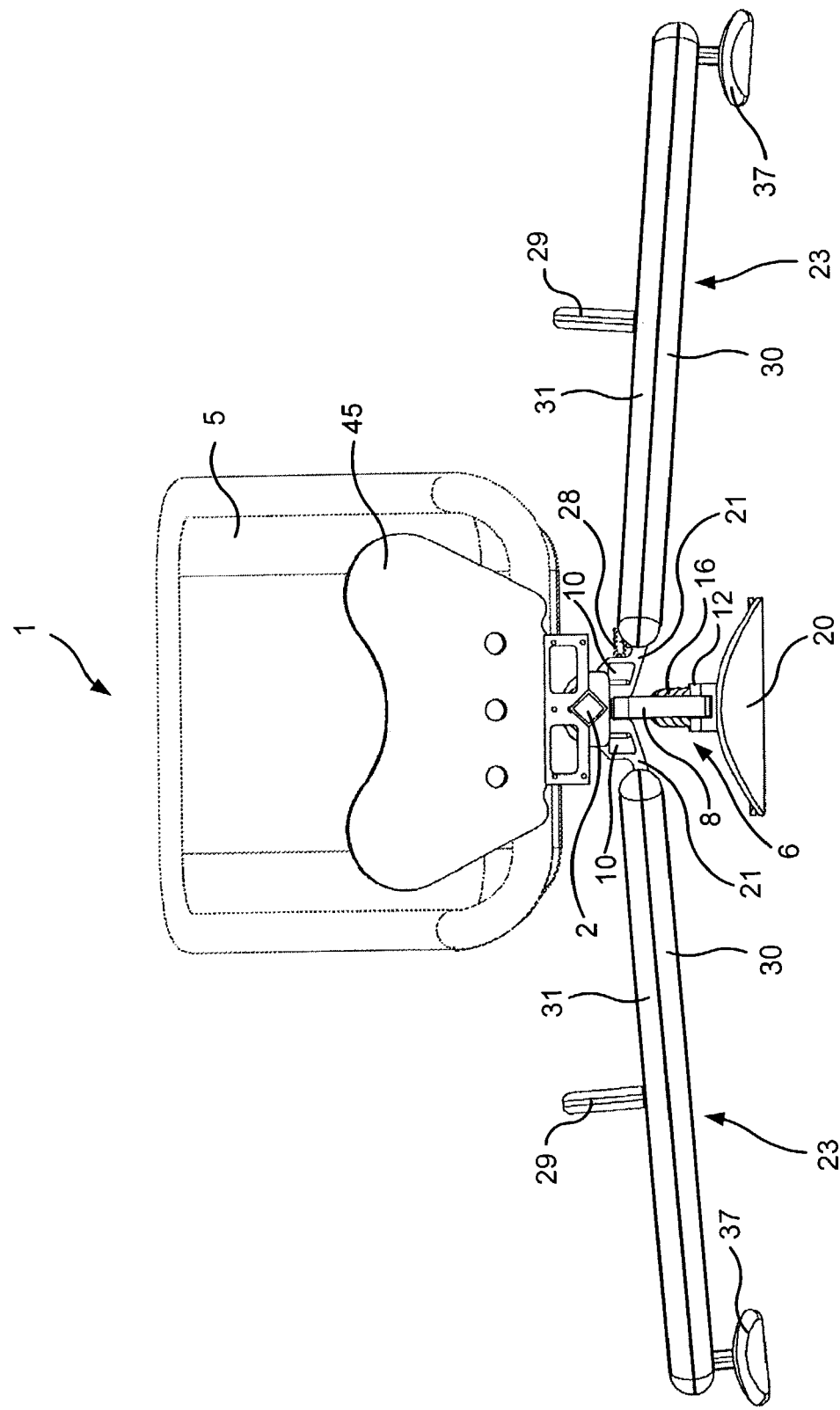
FIG. 8 is a front elevation of a preferred embodiment of the present invention illustrating the position of the main runner and of the stabilizer wings when the sled is traveling straight downhill or on level terrain.
Figure 9:
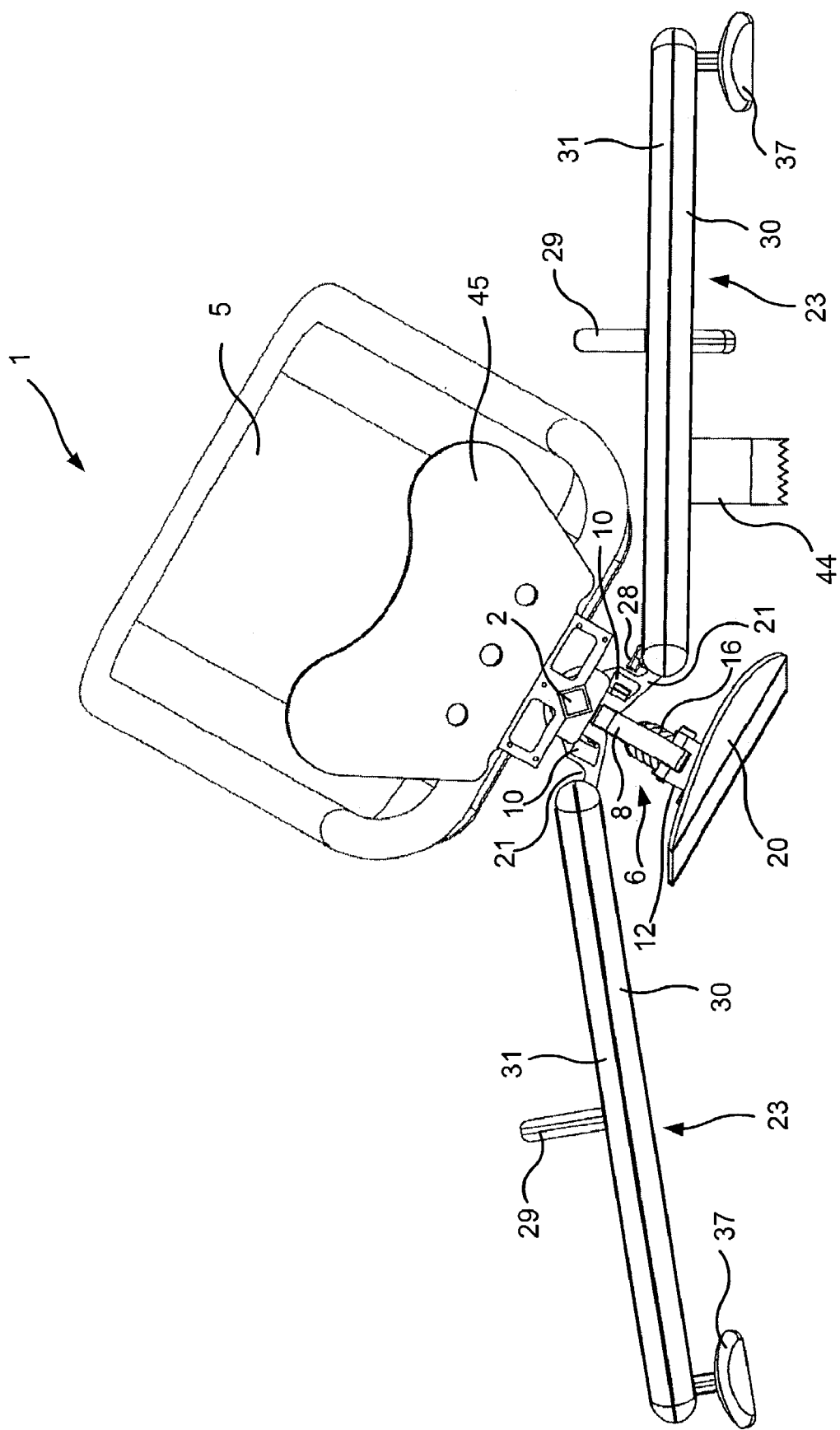
FIG. 9 is a front elevation of a preferred embodiment of the present invention illustrating the position of the main runner and of the stabilizer wings when the operator initiates a left turn and further, illustrates the left brake pad in a deployed position to assist the turn.
Figure 10:
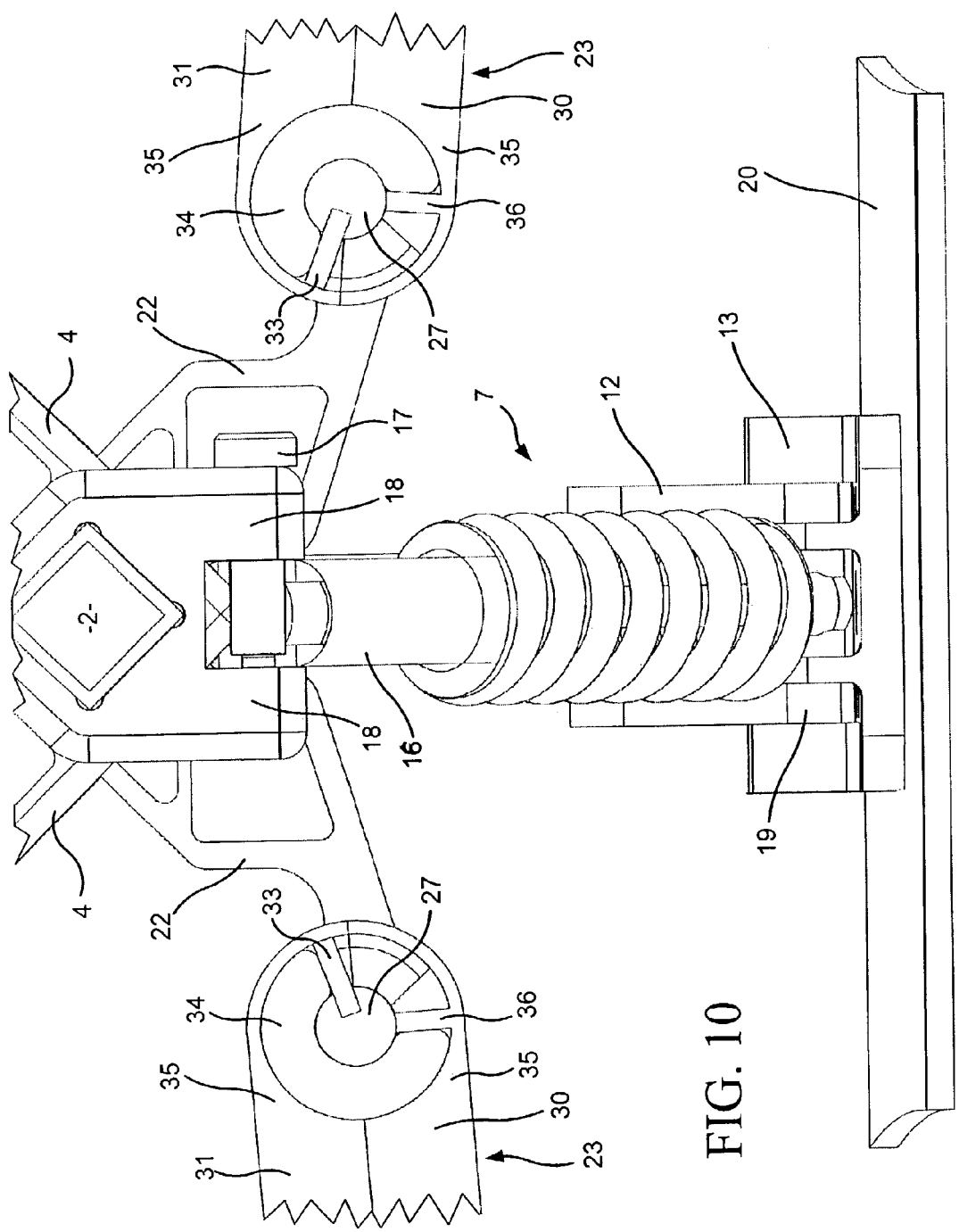
FIG. 10 is a partial cross-sectional rear view of the stabilizer wings attached to the sled, illustrating the position of resistance torsion means positioned within said stabilizer wings when the sled is on level terrain and running straight.
Figure 11:
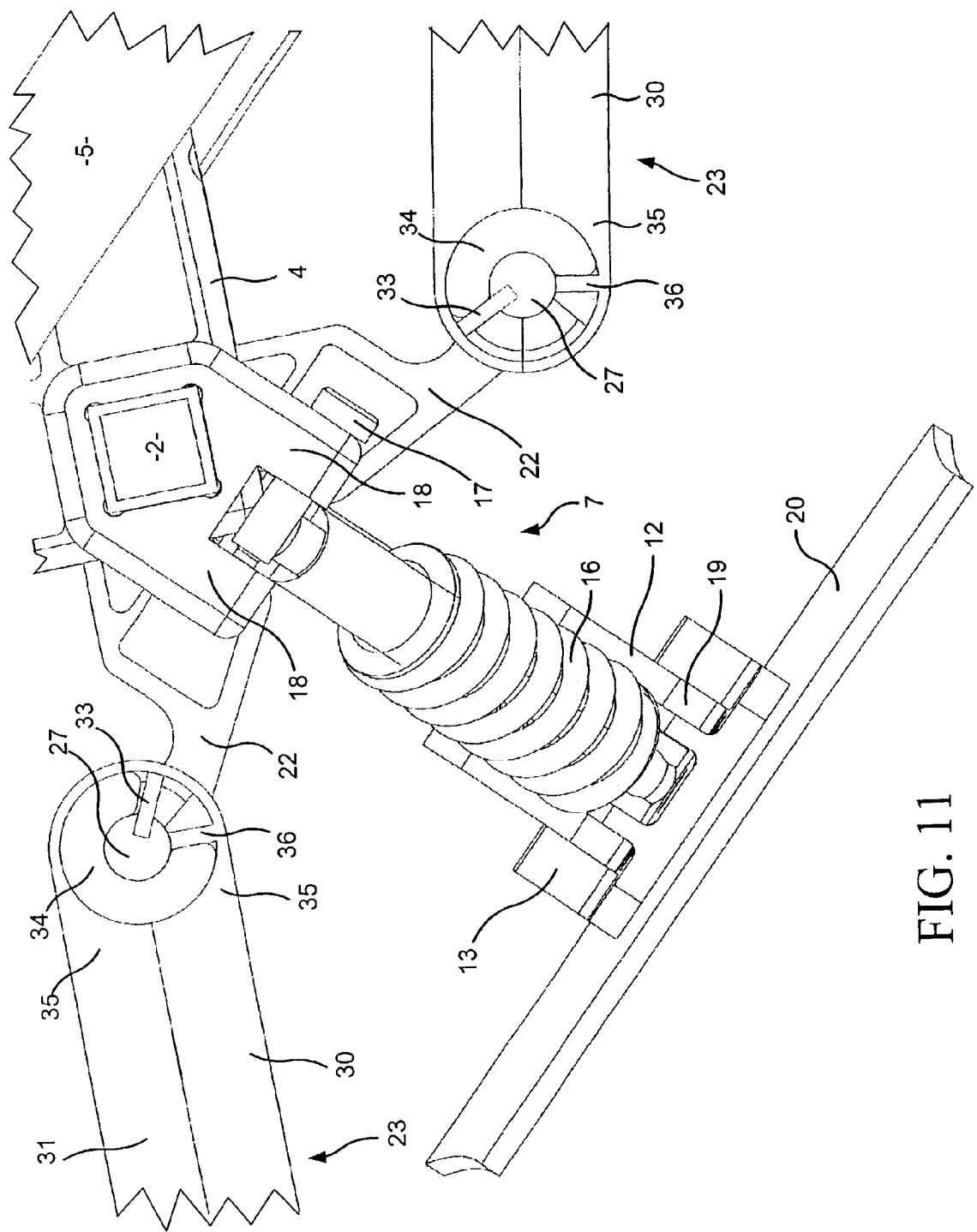
FIG. 11 is a partial cross-sectional view identical to that of FIG. 10, illustrating the position of the stabilizer wings and the resistance torsion means incorporated therein when the sled is in a right turning position.

With reference to FIG. 5 and FIG. 6, torsion bar 27 is positioned within each stabilizer wing 23 in the inboard portion thereof and is preferably removably attached at communicating aperture 25 and 26 in torsion bar 27 to stabilizer wing attachment brackets 21 and 22 adjustably attached to main longitudinal frame member 2, and disposed in said stabilizer wings 23 such that when attached to the main longitudinal frame member 2, said torsion bar 27 is generally parallel to main longitudinal frame member 2. Said torsion bar 27 is contained in and immovably fastened in place within said stabilizer wings 23 in cooperating torsion bar housing channel portions 32 of lower stabilizer wing portion 30 and upper stabilizer wing portion 31 of stabilizer wings 23. Preferably intermediate of communicating apertures 25 and 26 in torsion bar 27 and fixably attached to torsion bar 27 is compression plate 33. Compression plate 33 may be of any length between communicating apertures 25 and 26 but functions as intended when it is from about three inches to about six inches in length, and preferably is about four inches. With reference to FIG. 5, FIG. 6, FIG. 10 and FIG. 11, the portion of torsion bar 27 that contains compression plate 33 is partially encompassed by resistance torsion bushing 34 with the ends of said torsion bar 27 extending beyond each side of said resistance torsion bushing 34 through an aperture on each end thereof and corresponding in shape and diameter to said torsion bar 27. Said resistance torsion bushing 34 is confined within resistance torsion housing portion 35 of lower stabilizer wing portion 30 and upper stabilizer wing portion 31 of stabilizer wings 23 by compression plate 33 and stop plate 36 as illustrated by FIG. 10 and FIG. 11. In the preferred embodiment, resistance torsion bushing 34 may be a compressible material such as rubber, polymeric material or molded plastic having durometer of from about 30 to about 70 and preferably a durometer of about 50. Preferably, resistance torsion bushing 34 is made of molded plastic material such as urethane having a durometer of 50. An alternative, but less preferred embodiment to resistance torsion bushing 34 may be a system of resistance springs or a compressible fluid. Resistance torsion bushing 34 functions to limit the upward rotation of the stabilizer wings 23 about the longitudinal axis. Rotation is limited by resistance created when said resistance torsion bushing 34 is compressed by compression plate 33 as stabilizer wings 23 rotate upward during a turn and/or to conform to the terrain. FIG. 8 and FIG. 10 illustrate stabilizer wings 23 in a neutral, flat plane position, wherein resistance torsion bushing 34 is minimally compressed by compression plate 33. FIG. 9 illustrates sled 1 in a left turn, causing left stabilizer wing 23 to rotate upwardly about its longitudinal axis. Such rotation causes compression plate 33 to compress resistance torsion bushing 34, resulting in increased resistance to and depending upon the steepness of the turn, eventually the cessation of said upward rotation of said stabilizer wing 23 during that particular turn. As the turn is completed and stabilizer wing 23 rotates downwardly about its longitudinal axis, compression plate 33 reduces compression of resistance torsion bushing 34. Compression of resistance torsion bushing 34 assists said stabilizer wing 23 to return to its neutral position and acts apply sufficient downward pressure on stabilizer wing 23 such that stabilizer runner 37 (see FIG. 1) maintains contact with the snow surface. Downward rotation of stabilizer wings 23 is limited by stop plate 36 which limits the travel of compression plate 33. Such upward rotational resistance is desirable to prevent inadvertent "over steer"-when initiating or during a turn. In addition, said resistance torsion bushing 34 acts to assist rotation of said stabilizer wing 23 to a neutral, flat plane position. Resistance torsion resistance bushing 34 desirably limits the degree of upward rotation of said stabilizer wings 23 about the longitudinal axis to from about fifteen degrees to about thirty degrees above the neutral, position. Likewise, downward rotation of said stabilizer wings 23 about the longitudinal axis is limited by stop plate 36 to from about fifteen degrees to about thirty degrees below the neutral position. Preferably, the degree of rotation of said stabilizer wings 23 is limited to from about twenty degrees to about twenty-five degrees of rotation upwardly and downwardly from the neutral position.

Referring to FIG. 1 and FIG. 6, preferably removably attached at the distal portion of each said stabilizer wing 23 is an elongated stabilizer runner 37. FIG. 6 illustrates said stabilizer runner 37 and stabilizer runner attachment means 38. Said stabilizer runner 37 extends downwardly and generally perpendicular to said stabilizer wings 23 and is aligned such that the elongated portion thereof is generally parallel to main longitudinal frame member 2. Said stabilizer runner 37 is generally planar, and preferably with the forward and rear portions thereof being curved upwardly. Preferably, said stabilizer runner 37 is of such a length that it extends frontward and rearward of the distal end of said stabilizer wings 23. Preferably, said stabilizer runner 37 extends downwardly from stabilizer wings 23 such that as illustrated by FIG. 8, said stabilizer wings 23 extend laterally in a generally flat to slightly downward plane. Said stabilizer runner 37 may be a short length commercially available ski or may be of custom design. Generally, it is from 10 inches to about 45 inches and preferably from about 24 inches to about 30 inches. Stabilizer runner 37 may be constructed of the same or different material as main runner 20.

Figure 7:
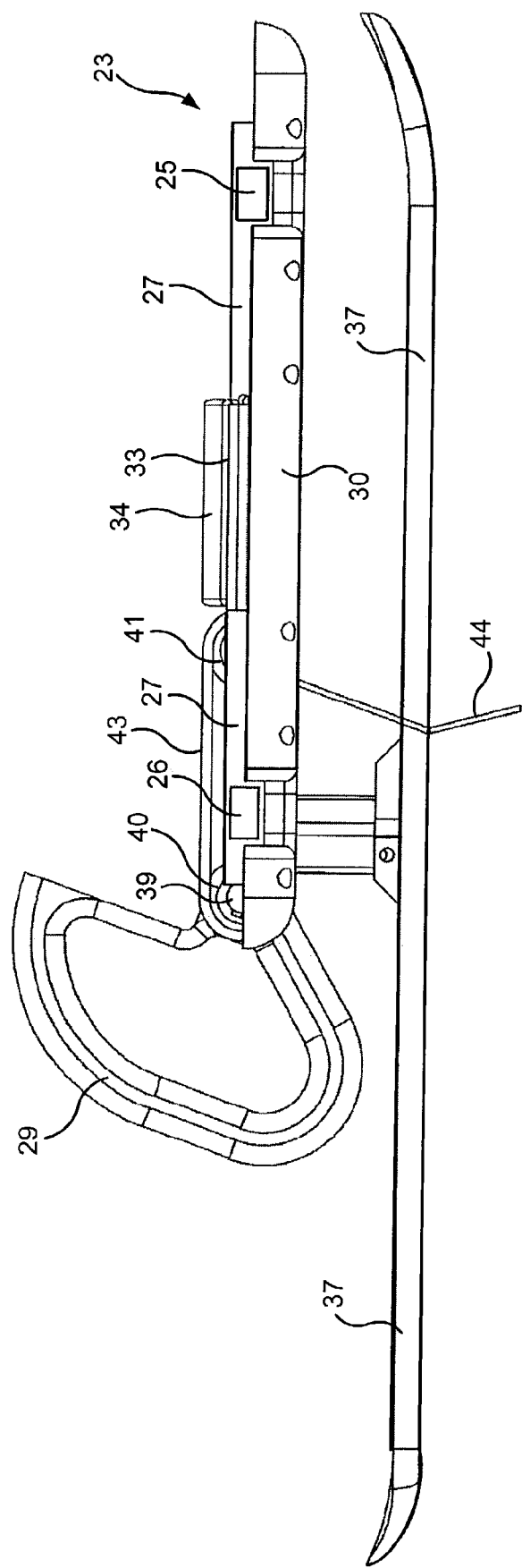
FIG. 7 is a side elevation view of a stabilizer wing of the preferred embodiment of the present invention illustrating the torsion bar and communicating apertures therein and further illustrating the braking means in a deployed position.

The high performance sled 1 of the present invention further comprises braking means for assisting with the turning, controlling the speed and stopping of the sled 1. FIG. 6 illustrates the preferred braking means which comprises hand brake lever 29 fixably attached to rotating brake shaft 39 mounted in lower stabilizer wing portion 30 of each stabilizer wing 23. Fixably attached to rotating brake shaft 39 is sprocket 40 (see FIG. 7). Sprocket 40 rotatably communicates with brake pad sprocket 41 fixably attached to rotatable brake pad shaft 42 by means of linkage 43. Linkage 43 may be any suitable means, including, but not limited to a belt, chain, cable or rod. Fixably attached to brake pad shaft 42 is brake pad 44. The operator activates braking by rotating hand brake lever 29 rearward. This rotates rotating brake shaft 39, thereby rotating sprocket 40, moving linkage 43 which rotates brake pad sprocket 41, thereby rotating brake pad shaft 42, causing brake pad 44 to be deployed as illustrated by FIG. 7. The amount of rotation applied to hand brake lever 29 determines the degree of contact of said brake pad 44 with the snow surface. Hand brake levers 29 may be independently operated enabling the operator to deploy one or both of brake pad 44 to assist with turning of sled 1 or to slow or stop sled 1 as desired. In addition to deploying brake pads 44, hand brake levers 29 may be utilized by the operator as handles to assist the operator staying in seat 5 during operation of sled 1, especially during a turning maneuver.

An alternative embodiment of the braking means of the present invention is foot-operated means comprising a right foot pedal and a left foot pedal adjustably attached to main longitudinal frame member 2 in place of foot plate 45. Said foot pedals are mounted on said main longitudinal frame member such that they may be activated by the operator independently or together. Each foot pedal is independently attached to linkage means attached by suitable means to brake pads. Alternatively, brake pads 44 may be positioned in conjunction with and relative to rearmost base plate. Said linkage means includes, but is not limited to cable/spool assembly and rod/hinge systems.

Sled 1 is primarily intended for use on snow covered, down hill terrain and provides highly desirable maneuverability, stability and speed control characteristics. In the operation of sled 1, the operator sits in seat 5 and places his or her feet on foot plate 45. As sled 1 proceeds down the terrain, the operator may initiate a turn by leaning in the direction of the desired turn as illustrated by FIG. 9, causing seat 5 to tilt in the direction of the desired turn thereby causing main runner 20 to deflect such that the edge thereof cuts into the snow surface causing sled 1 to turn in the direction the operator is leaning. A gentle turn is accomplished by leaning slightly, while a more sharp turn is accomplished by a hard lean in the direction of the desired turn. As further illustrated by FIG. 9, an important feature of the present invention resides in the resistance torsion bushing 34 enabling stabilizer wings 23 to independently, restrictably rotate about the longitudinal axis at their attachment point to main longitudinal frame member 2 such that both stabilizer runners 37 maintain contact with the terrain surface during a turn, providing roll stability to sled 1 particularly in a turn or series of turns in opposite directions. A turn in the desired direction may be further facilitated by deployment of brake pad 44 on the stabilizer wing 23 on the side of the direction of the desired turn. Brake pad 44 may also be deployed on one or both of stabilizer wings 23 to control the speed of or stop sled 1.

Figure 12:
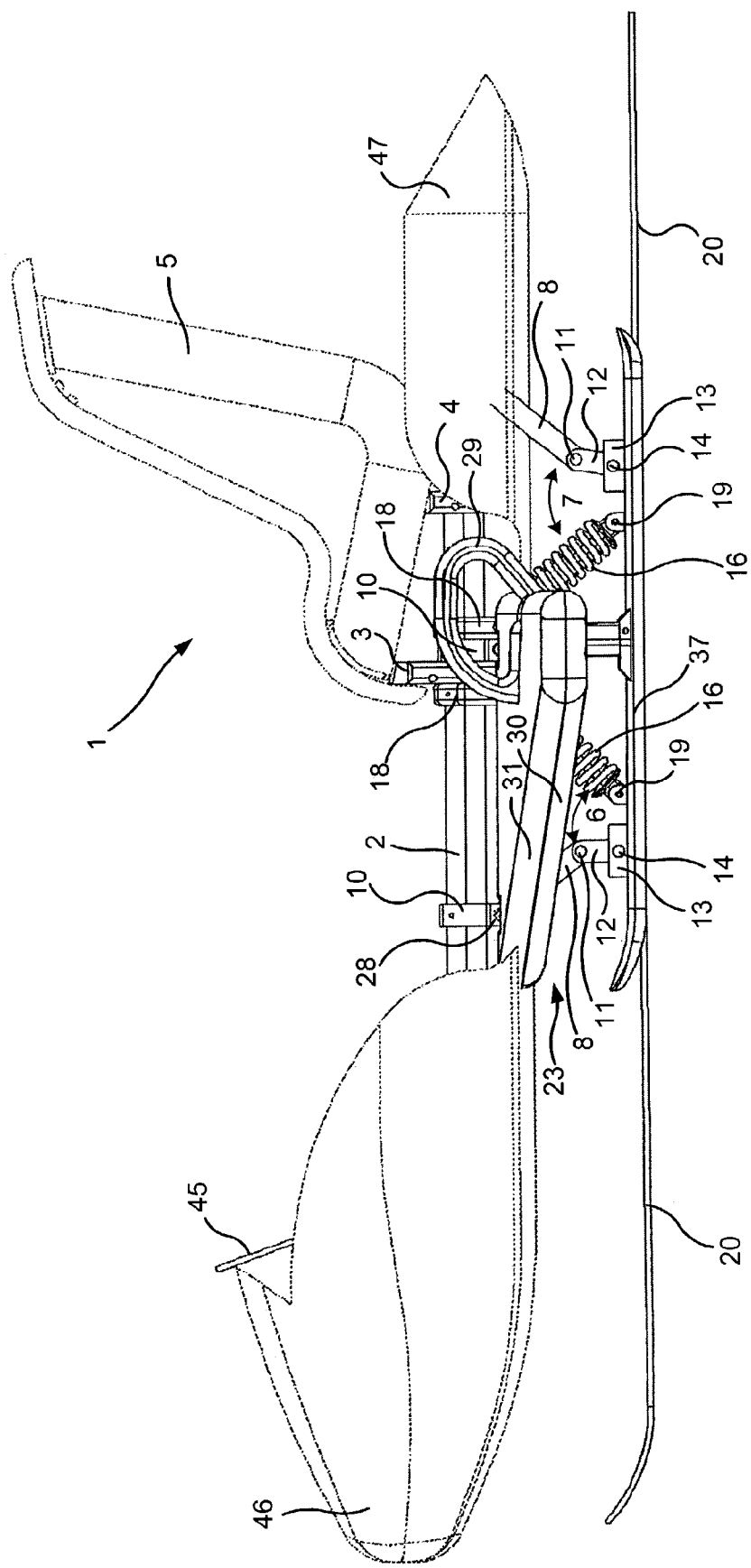
FIG. 12 is a side elevation of the preferred embodiment sled of the present invention illustrating the sled with front and rear operator protection cowlings.

Optionally, but preferably, sled 1 also comprises front protective cowling 46 and rear protective cowling 47 as illustrated by FIG. 12. Said front protective cowling 46 is preferably removably attached by any suitable means to the front portion of the elongated portion of main longitudinal frame member 2, forward of foot plate 45. Rear protective cowling 47 is removably attached by any suitable means to the rear portion of the elongated portion of main longitudinal frame member 2 and rearward of seat 5. Said front protective cowling 46 and said rear protective cowling 47 shields snow spray and possible debris from contacting the operator during operation of sled 1. They may be made of any suitable material including, but not limited to metal, molded plastic, composite materials or fiberglass. Preferably, they are made of lightweight molded plastic.

It is understood that the examples herein are merely illustrative of the present invention, and that certain modifications of the article and/or methods employed may be made and still achieve the objectives of the invention. Such modifications are contemplated within the scope of the subject invention.

What is claimed is:

1. A steerable, brakeable, roll stable snow sled comprising:
    a main longitudinal frame member having an elongated portion;
    seating means attached upon the elongated portion of said main longitudinal frame member and rearward of the mid-portion thereof;
    foot support means upwardly disposed and attached to the elongated portion of said main longitudinal frame member at the front portion thereof;
    stabilizer wings laterally disposed directly opposite of each other on each side of and longitudinally rotatably attached to the elongated portion of said main longitudinal frame member such that the rear portion thereof is laterally aligned approximately with the front portion of said seating means and having attached at the distal portion thereof, an elongated stabilizer runner extending downwardly and aligned generally perpendicular to said stabilizer wings and positioned such that the elongated portion of said stabilizer runner is aligned parallel to the elongated portion of said main longitudinal frame member;
    resistance torsion means situated on the inboard portion of each of said stabilizer wings and generally parallel to the elongated portion of said main longitudinal frame member and being a point of attachment of said stabilizer wings to said main longitudinal frame member;
    in-line, two stage suspension and shock absorbing means hingedly connected at the upper portion thereof to the mid portion of the elongated portion of said main longitudinal frame member and extending downwardly therefrom;
    a main runner attached at its upper surface and approximately at the mid-portion thereof to a base plate hingedly attached to the lower portion of said suspension and shock absorbing means; and
    braking means.

2. The snow sled of claim 1 wherein said in-line suspension and shock absorbing means comprises a damper bar attached at the upper portion thereof by upper damper hinge means to top damper attachment means for attachment thereof to the elongated portion of said main longitudinal frame member and attached at the lower portion thereof by lower damper hinge means to base plate connecting bar hingedly attached at the lower portion thereof to a base plate for attachment to said main runner and which suspension and shock absorbing means further comprises a shock absorber disposed longitudinally in-line with said damper bar and rearward thereof, attached at the upper portion thereof by upper shock absorber hinge means to top shock absorber attachment means for attachment to the elongated portion of said main longitudinal frame member and attached at the lower portion thereof by lower shock absorber hinge means to a base plate for attachment to said main runner.

3. The snow sled of claim 2 wherein said in-line suspension and shock absorbing means is slideably, adjustably attached to the elongated portion of said longitudinal main frame member by said top damper attachment means and said top shock absorber attachment means and to said main runner by said base plate such that said damper bar and said shock absorber from their points of attachment to said upper damper attachment means and said top shock absorber attachment means respectively, are disposed downward and angularly inward towards each other to the point of attachment to said base plate connecting bar and said base plate respectively, and such that the angle of said damper bar is from about thirty degrees to about sixty degrees and such that the angle of said shock absorber is from about forty degrees to about fifty degrees.

4. The snow sled of claim 3 wherein there is a first in-line suspension and shock absorbing means and a second in-line suspension and shock absorbing means attached to the elongated portion of said main longitudinal frame member and said base plate, and positioned such that the second in-line suspension and shock absorbing means is rearward of and in mirror image, tandem relationship to said first in-line suspension and shock absorbing means.

5. The snow sled of claim 4, wherein said fit in-line suspension and shock absorber means is attached to said main longitudinal frame member and said base plate such that the point of attachment thereof to said main longitudinal frame member is generally forward of the midpoint thereof and the second in-line suspension and shock absorber means is positioned such that the top shock absorber attachment means point of attachment to said main longitudinal frame member is from about zero inches to about ten inches rearward of the top shock absorber attachment means point of attachment to said main longitudinal frame member of said first in-line suspension and shock absorbing means.

6. The snow sled of claim 2 wherein the portion of the base plate connected to the base plate connecting bar contains a damper stop bar to restrict the travel of said damper bar such that said main longitudinal frame member is restricted from contacting said main runner during operation of said sled.

7. The snow sled of claim 2 wherein said shock absorber is a coil over gas shock absorber.

8. The snow sled of claim 1 wherein said resistance torsion means comprises an elongated, cylindrical torsion bar having communicating apertures generally at each end thereof for attachment to stabilizer wing coupling portion of stabilizer wing attachment brackets for attachment to said main longitudinal frame member; a compression plate fixably attached to said torsion bar; and a cylindrical torsion bushing partially encompassing that portion of said torsion bar containing said compression plate from the top portion of said compression plate and terminating at a stop plate forming a portion of a resistance torsion bushing housing.

9. The resistance torsion means of claim 8 wherein said resistance torsion bushing comprises a compressible material selected from the group consisting essentially of rubber, polymeric materials and molded plastic having a durometer of from about thirty to about seventy.

10. The resistance torsion means of claim 9 wherein said resistance torsion bushing comprises urethane having a durometer of about fifty.

11. The snow sled of claim 1 wherein said stabilizer wings are attached to the elongated portion of said main longitudinal frame member by stabilizer wing coupling means portion of stabilizer wing attachment brackets adjustably, slideably attached to the elongated portion of said main longitudinal frame member.

12. The snow sled of claim 11 wherein said stabilizer wings are detachable from said stabilizer wing attachment brackets.

13. The snow sled of claim 11 wherein said stabilizer wings laterally extend from their point of attachment to said main longitudinal frame member is from about forty eight inches to about sixty inches and the width thereof from the front to the rear at the point of attachment to stabilizer wing attachment brackets is from about ten inches to about thirty inches.

14. The snow sled of claim 1 wherein said stabilizer wings contain means for housing resistance torsion means at the portion thereof inboard and generally parallel to the elongated portion of said main longitudinal frame member when said stabilizer wings are attached thereto.

15. The snow sled of claim 1 wherein said braking means comprises an independently operable hand brake lever situated on each stabilizer wing, attached to a rotatable brake shaft, which rotatably communicates by linkage means with a rotatable brake pad shaft having a brake pad attached thereto, said rotatable brake shaft, linkage means, rotatable brake pad shaft and brake pad being positioned within said stabilizer wing.

16. The snow sled of claim 15 wherein said braking means for controlling the speed and stopping of said sled is positioned within each stabilizer wing near the trailing edge thereof and such that an operator activates braking by rotating said hand brake lever rearward.

17. The snow sled of claim 1 wherein said braking means for controlling the speed and stopping of said sled comprises independently operated left and right foot brake pedals mounted upon the front portion of the elongated portion of said main longitudinal frame member, independently attached to linkage means communicating with a left and a right brake pad pivotally attached to the rearward, lower portion of said snow sled such that when said foot pedal is depressed by the operator of said snow sled, the brake pad corresponding to the foot brake pedal depressed.

18. The snow sled of claim 1 wherein said main runner comprises a snowboard.

19. The snow sled of claim 1 wherein said seating means comprises a bucket seat slideably, adjustably attached to the elongated portion of said main longitudinal frame member.

20. The snow sled of claim 1 wherein said foot support means is slideably, adjustably attached to the elongated portion of said main longitudinal frame member.

21. The snow sled of claim 1 which further comprises a front protective cowling removably attached to the front portion of the elongated portion of said main longitudinal frame and in forward of said foot support means and extending upwardly and rearward and terminating forward of said seating means and a rear protective cowling removably attached to the rear portion of the elongated portion of said main longitudinal frame member and rearward of said seating means and extending forward and upward and terminating at the rear portion of said seat.

22. A steerable, brakeable, roll resistant snow sled which comprises:
  a main longitudinal fame member having an elongated portion, wherein the elongated portion has a length of from thirty-six inches to about seventy-two inches;
  a bucket seat upwardly disposed and adjustably, slideably attached to the elongated portion of said main longitudinal frame member generally rearward of the midpoint thereof;
  foot support means upwardly disposed and adjustably, slideably attached to the elongated portion of said main frame member at the front portion thereof;
  a stabilizer wing removably, and adjustably attached to and on each side of the elongated portion of said main longitudinal frame member by a stabilizer wing coupling means portion of stabilizer wing attachment means and positioned laterally directly opposite each other approximately at the mid-position of said main longitudinal frame member and being limitedly rotatable upwardly and downwardly relative to the elongated portion of said main longitudinal frame member and having attached thereto at the inboard portion thereof and positioned generally parallel to the elongated portion of said main longitudinal frame member, resistance torsion means comprising an elongated cylindrical shaped torsion bar having communicating apertures generally at each end portion thereof for attachment of said stabilizer wing to said main frame member by said stabilizer wing coupling portion of stabilizer wing attachment means and further comprising a stop plate attached thereto and a cylindrical limitedly compressible torsion bushing encompassing that portion of said torsion bar containing a compression plate from the top portion of said compression plate and terminating at a stop plate positioned within said stabilizer wing to which said torsion resistance means is attached and further, wherein each said stabilizer wing has attached at the distal portion thereof, an elongated stabilizer runner extending downward and generally perpendicular to said stabilizer wing and positioned such that the elongated portion of said stabilizer runner is aligned generally parallel to the elongated portion of said main longitudinal frame member;
  a first in-line suspension and shock absorbing means and a second in-line suspension and shock absorbing means, each comprising a damper bar hingedly attached at the upper portion thereof to top damper attachment means and the lower portion of said damper bar hingedly attached to a base plate connecting bar, attached to a base plate by base plate hinge means, said base plate having a damper stop bar, and further comprising a shock absorber disposed longitudinally, in-line with said damper bar, hingedly attached at the upper portion thereof to top shock absorber attachment means and hingedly attached at the lower portion thereof to the shock absorber attachment portion of the base plate and wherein said first in-line suspension and shock absorbing means is slideably, adjustably attached to the elongated portion of said main longitudinal frame member by said top damper attachment means and said top shock absorber attachment means, wherein said first in-line suspension and shock absorbing means is positioned immediately forward of the mid-portion of the elongated portion of said main longitudinal frame member and such that said damper bar is disposed forward of said shock absorber and further, wherein said base plate hingedly attached to said base plate connecting bar is attached to a main runner at the lateral mid-line thereof and immediately forward of the mid-point of the elongated portion thereof and such that said damper bar at its point of attachment to base plate connecting bar has an angle upward and forward of from about thirty degrees to about sixty degrees and wherein said shock absorber attachment portion of said base plate is attached to a main runner at the lateral mid-line thereof and immediately forward of the mid-point of the elongated portion thereof and such that said shock absorber at its point of attachment to said base plate has an angle upward and rearward of from about forty degrees to about fifty degrees, and wherein said second in-line suspension and shock absorbing means is similarly attached to the elongated portion of said main longitudinal frame member and said main runner, rearward of said first in-line suspension and shock absorbing means relative to the front portion of said snow sled in tandem and mirror image relation to said first in-line suspension and shock absorbing means;

an elongated main runner comprising a generally flat surface with a generally upwardly curved front and rear portions attached at the upper surface and generally at the lateral mid-point and longitudinal mid-portion thereof to said base plates; and braking means positioned within each stabilizer wing comprising an independently operable hand brake lever fixably attached to a rotatable brake shaft which communicates by linkage means to a rotatable brake pad shaft to which is fixably attached a brake pad, which when deployed contacts the snow surface.

23. The snow sled of claim 22 which further comprises a front protective cowling removably attached to the front portion of the elongated portion of said main longitudinal frame member and forward of said foot support means and extending upwardly and rearward therefrom and terminating forward of the front portion of said bucket seat, and a rear protective cowling removably attached to the rear portion of the elongated portion of said main longitudinal frame member and of said bucket seat and extending forward therefrom and upward, terminating at the rear portion of said bucket seat.

24. The snow sled of claim 22 wherein said main runner is a snowboard.

\* \* \* \* \*